US008191913B1

(12) United States Patent
Jessome

(10) Patent No.: US 8,191,913 B1
(45) Date of Patent: Jun. 5, 2012

(54) CENTER FOOTREST FOR A WHEELCHAIR

(76) Inventor: Emmett A. Jessome, Whitecourt (CA)

( * ) Notice: Subject to any disclaimer, the term of this patent is extended or adjusted under 35 U.S.C. 154(b) by 0 days.

(21) Appl. No.: 12/842,512

(22) Filed: Jul. 23, 2010

Related U.S. Application Data

(60) Provisional application No. 61/271,542, filed on Jul. 23, 2009.

(51) Int. Cl.
*A47C 7/50* (2006.01)
*B62J 25/00* (2006.01)

(52) U.S. Cl. .................. 280/304.1; 280/250.1; 280/291; 297/423.35; 297/423.36

(58) Field of Classification Search ............... 280/250.1, 280/288.4, 291, 304.1; 297/423.35, 423.36
See application file for complete search history.

(56) References Cited

U.S. PATENT DOCUMENTS

| | | | | |
|---|---|---|---|---|
| 3,857,606 | A | 12/1974 | Rodaway | |
| 3,990,744 | A | 11/1976 | Rodaway | |
| 4,176,879 | A | 12/1979 | Rodaway | |
| 4,555,121 | A * | 11/1985 | Lockard et al. | 280/30 |
| 4,679,849 | A * | 7/1987 | Torgny | 297/330 |
| 4,693,490 | A * | 9/1987 | Loodberg et al. | 280/650 |
| 4,722,572 | A | 2/1988 | Sata | |
| 4,770,467 | A | 9/1988 | Zinn | |
| 4,988,114 | A | 1/1991 | Thornton, Jr. et al. | |
| 4,989,890 | A | 2/1991 | Lockard et al. | |
| D315,539 | S | 3/1991 | Okamoto | |
| 5,209,509 | A | 5/1993 | Gay | |
| 5,217,239 | A * | 6/1993 | Koet | 280/250.1 |
| 5,401,045 | A | 3/1995 | Foerster et al. | |
| 5,480,172 | A * | 1/1996 | James | 280/250.1 |
| D395,263 | S | 6/1998 | Ponce | |
| 6,032,975 | A * | 3/2000 | Hanson et al. | 280/647 |
| 6,217,050 | B1 | 4/2001 | Dickie et al. | |
| 6,270,111 | B1 * | 8/2001 | Hanson et al. | 280/650 |
| 6,375,209 | B1 * | 4/2002 | Schlangen | 280/250.1 |
| 6,623,022 | B2 * | 9/2003 | Malassigne et al. | 280/250.1 |
| 6,705,629 | B2 * | 3/2004 | Post et al. | 280/250.1 |
| 6,981,714 | B1 | 1/2006 | Schell et al. | |
| 7,055,835 | B2 * | 6/2006 | Wu | 280/86.1 |
| D530,651 | S | 10/2006 | Shaffer | |
| 2007/0102615 | A1 * | 5/2007 | Engman | 248/371 |
| 2009/0072510 | A1 * | 3/2009 | Mueller | 280/250.1 |
| 2009/0218784 | A1 * | 9/2009 | Porcheron | 280/250.1 |
| 2010/0038880 | A1 * | 2/2010 | Bagg | 280/250.1 |
| 2010/0117328 | A1 * | 5/2010 | Johnson et al. | 280/250.1 |

* cited by examiner

*Primary Examiner* — Kevin Hurley
*Assistant Examiner* — Marc Scharich
(74) *Attorney, Agent, or Firm* — Montgomery Patent & Design, LLC; Robert C. Montgomery; Joseph T. Yaksich

(57) ABSTRACT

A center footrest apparatus for use on an existing wheelchair comprises a foot resting plate arranged in a sling-like manner and attached to each side of the chair frame. The apparatus is further provided in a second embodiment comprising a rigidly mounted and height adjustable center footrest portion supported by a T-bar that attaches to the chair frame. The center footrest allows a person to be moved around in tight quarters without interference caused by conventional folding dual footrests.

10 Claims, 6 Drawing Sheets

CENTER FOOTREST FOR A WHEELCHAIR

RELATED APPLICATIONS

The present invention was first described in and claims the benefit of U.S. Provisional Application No. 61/271,542 filed Jul. 23, 2009, the entire disclosures of which are incorporated herein by reference.

FIELD OF THE INVENTION

The present invention relates generally to wheelchairs, and in particular, to an attachment for wheelchairs which provides an adjustable and compact foot rest function for a wheelchair.

BACKGROUND OF THE INVENTION

Wheelchairs are one of the most commonly utilized tools in the various care giving fields such as health care, nursing homes, and the like. Wheelchairs are useful as temporary and permanent aids to people with a variety of temporary and permanent conditions including injury, loss of use of limbs, fatigue, nausea, and the like. In many cases, wheelchairs are utilized for those with diminished leg function. Such users generally maneuver their own wheelchair with use of their arms or powered driving features.

One (1) of the most important functions of wheelchairs is obviously that of maintaining a user's legs and feet in a desirable position during use. Many times when a wheelchair is necessary it is due to some condition which affects a user's ability to move their legs or feet; as such, a supportive feature such as a footrest is critical for allowing the user to move about safely and comfortably. However, many such footrests are bulky, adding a non-trivial length to the front of the wheelchair which can make it difficult for a user to maneuver in tightly enclosed spaces such as bathrooms and hallways. In some cases, the added length may prevent a user from being able to turn around in such locations, which can lead to great frustration.

Various attempts have been made to provide wheelchair footrests. Examples of these attempts can be seen by reference to several U.S. patents. U.S. Pat. No. 3,990,744, issued in the name of Rodaway, describes a hingedly deployable wheelchair foot rest assembly.

U.S. Pat. No. 4,770,467, issued in the name of Zinn, describes a footrest unit for wheelchairs which allows a user to rotate each footrest portion outward to an out-of-the-way position.

U.S. Pat. No. 5,209,509, issued in the name of Gay et al., describes a wheelchair footrest assembly which is rotatable up and down to provide a desired angle to a user's legs during use.

U.S. Pat. No. 6,217,050, issued in the name of Dickie et al., describes an adjustable footrest which allows a user to selectively adjust the angle and height of each foot's footrest individually.

Additionally, ornamental designs for a wheelchair footrest exist, particularly U.S. Pat. Nos. D 315,539, D 395,263 and D 530,651. However, none of these designs are similar to the present invention.

While these devices fulfill their respective, particular objectives, each of these references suffer from one (1) or more of the aforementioned disadvantages. Many such devices pose a hindrance to a user's movement when in confined locations such as bathrooms or hallways. Also, many such devices do not provide a full range of desirable adjustability including height adjustability. Furthermore, many such devices which allow for compaction cease to provide their footrest functions when compacted and as such are only suited for maneuvering in close quarters for purposes of storage and the like. Accordingly, there exists a need for a footrest for wheelchairs without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide consistent, adjustable, comfortable footrest functionality for a user in a wheelchair in a manner which maximizes the user's ability to navigate narrow locations without affecting footrest functions. Thus, the object of the present invention is to solve the aforementioned disadvantages and provide for this need.

To achieve the above objectives, it is an object of the present invention to provide a footrest for a wheelchair which provides a narrowed wheelchair assembly, thereby allowing an occupant to move freely through tightly confined quarters. This is accomplished by providing a centrally located footrest platform for a common wheelchair in lieu of conventional fold-down footrests.

Another object of the present invention is to allow a user to selectively adjust the height of the platform via a pair of length adjustable straps which suspend the platform in place.

Yet still another object of the present invention is to allow a user to permanently or temporarily attach the device to a wheelchair. The device comprises a pair of offset posts which attach to front vertical frame members of a wheelchair with clamping fittings, thereby providing an attachment means to the straps for suspending the platform at a central and slightly forward location relative to the wheelchair.

Yet still another object of the present invention is to allow a user to rotate the footrest relative to the straps in order to achieve a desired comfortable positioning of their feet.

Yet still another object of the present invention is to provide an alternate rigid-footrest embodiment comprising a vertically adjustable "T"-shaped support member which is attachable to vertical frame members of a wheelchair. The support member provides connection to a centrally-located rigid footrest which allows for easier maneuvering in tightly confined quarters.

Yet still another object of the present invention is to provide a method of utilizing the device that provides a unique means of removing previously installed fold-down footrest portions from vertical frame members of an existing wheelchair, installing the offset posts onto the vertical frame members of the existing wheelchair via the corresponding fittings, tightening the fittings at a desired height, securing an end of each of the pair of straps to one of the offset posts, suspending the footrest platform at a central position in front of the wheelchair via the straps, selectively adjusting the length of the straps to locate the footrest at a desired height and horizontal position, and placing an occupant's feet on the footrest to provide a compact and rotatably adjustable foot support function.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
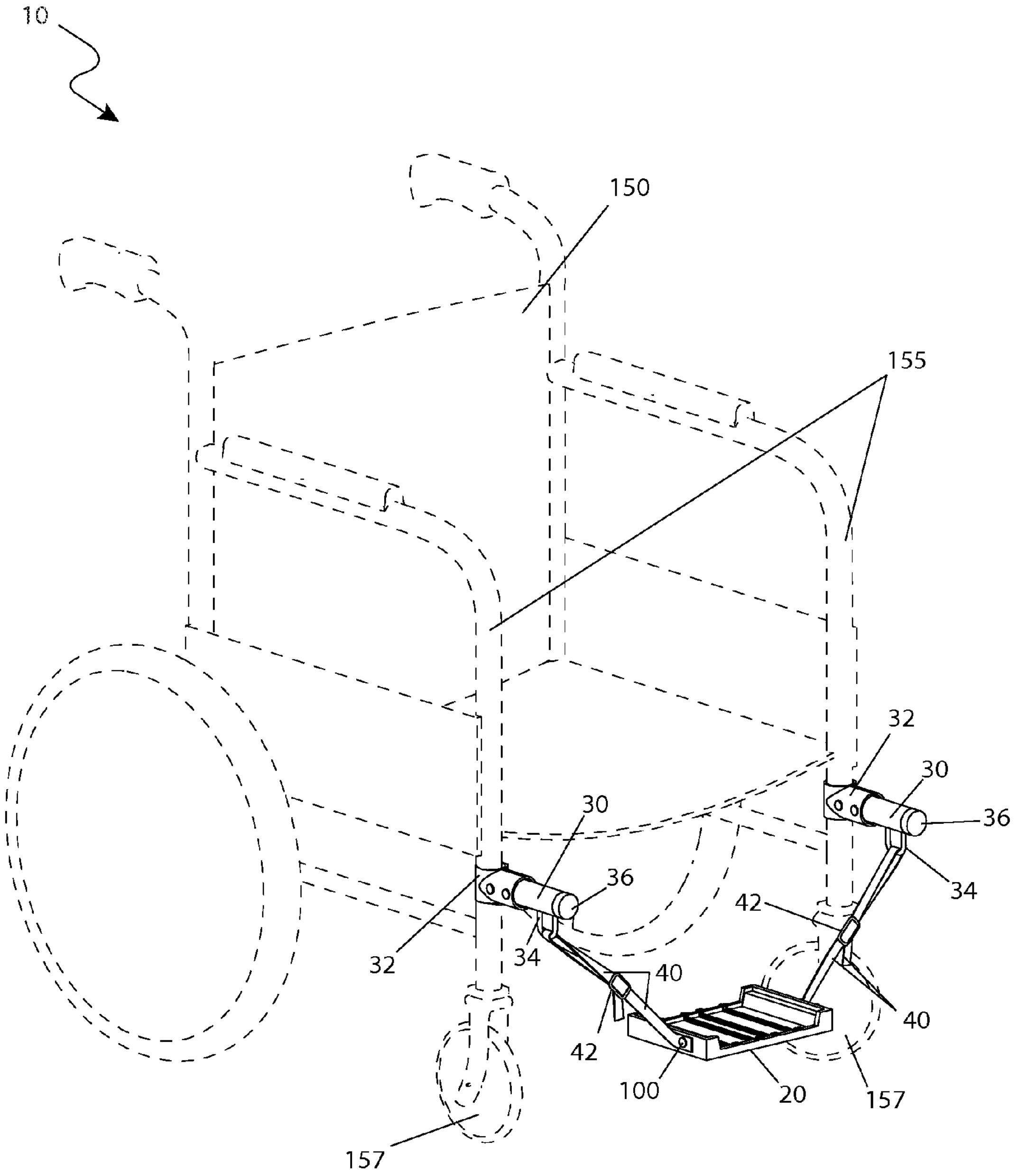
FIG. 1 is an environmental view of a center footrest for a wheelchair 10, according to a preferred embodiment of the present invention.

10 center footrest for a wheelchair
15 rigid footrest embodiment
20 platform
22 curb feature
24 top surface
30 offset post
32 "T" fitting
34 strap fastener
36 end cap
38 welded joint
40 strap
42 strap fitting
70 rigid platform
80 upper support member
81 adjustable support member
82 first adjusting aperture pair
84 locking pin
85 second adjusting aperture pair
86 retaining pin fastener
88 brace
100 first fastener
105 second fastener
110 third fastener
150 wheelchair
155 vertical frame member
157 front wheel

DETAILED DESCRIPTION OF THE PREFERRED EMBODIMENT

Figure 2:
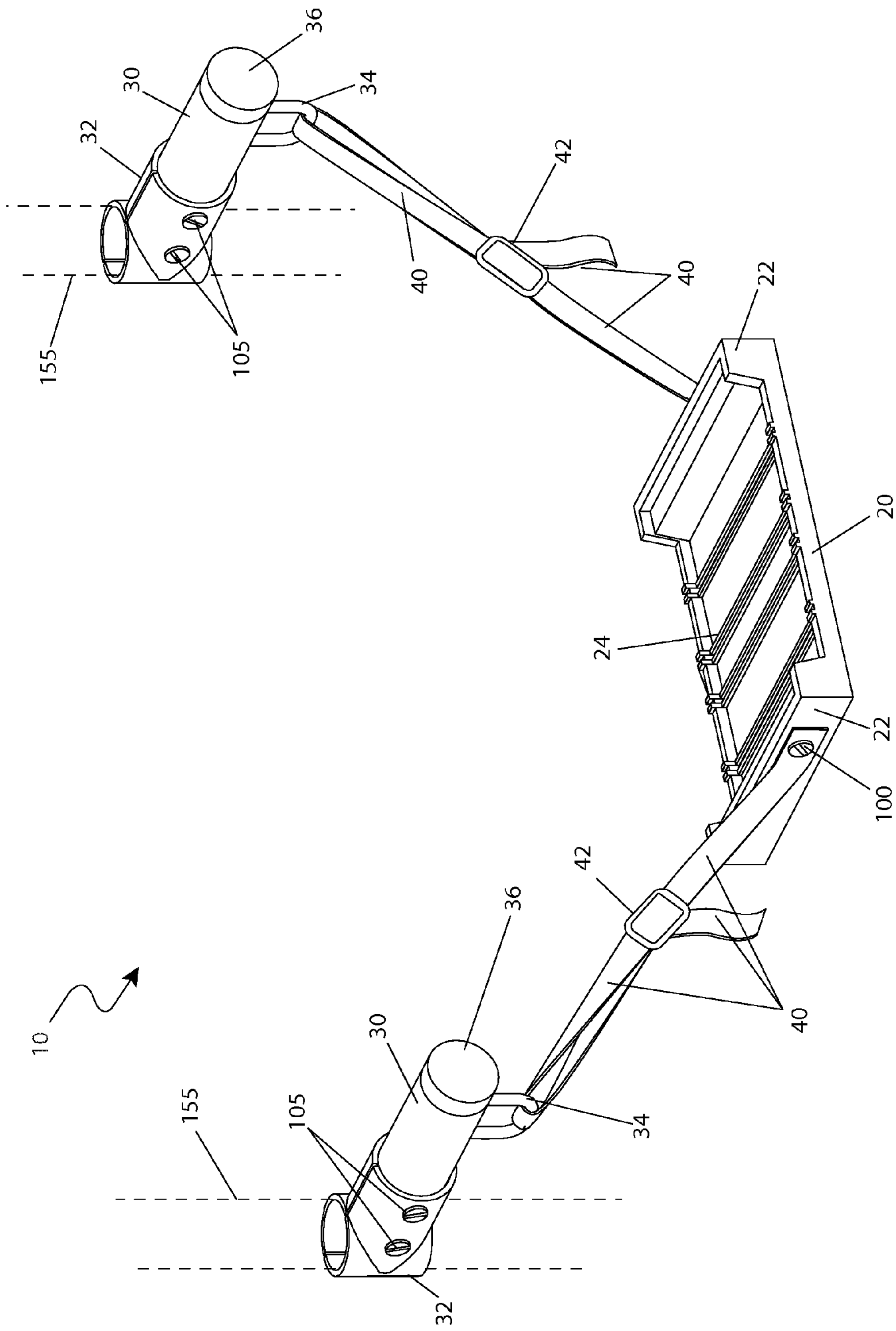
FIG. 2 is a perspective view of the center footrest for a wheelchair 10, according to a preferred embodiment of the present invention.
Figure 3:
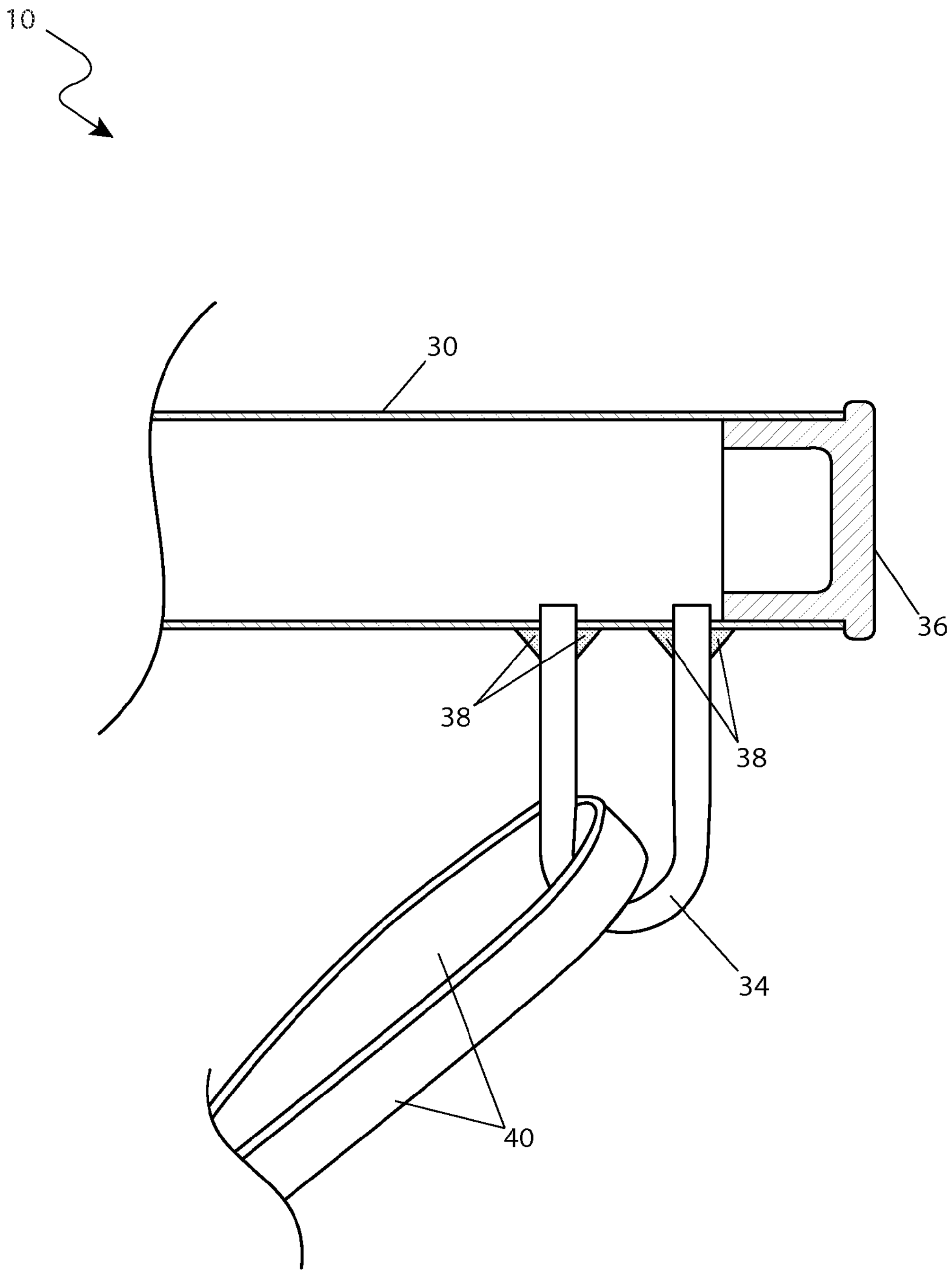
FIG. 3 is a close-up view of a strap fastener portion 34 for the center footrest for a wheelchair 10, according to a preferred embodiment of the present invention.
Figure 4:
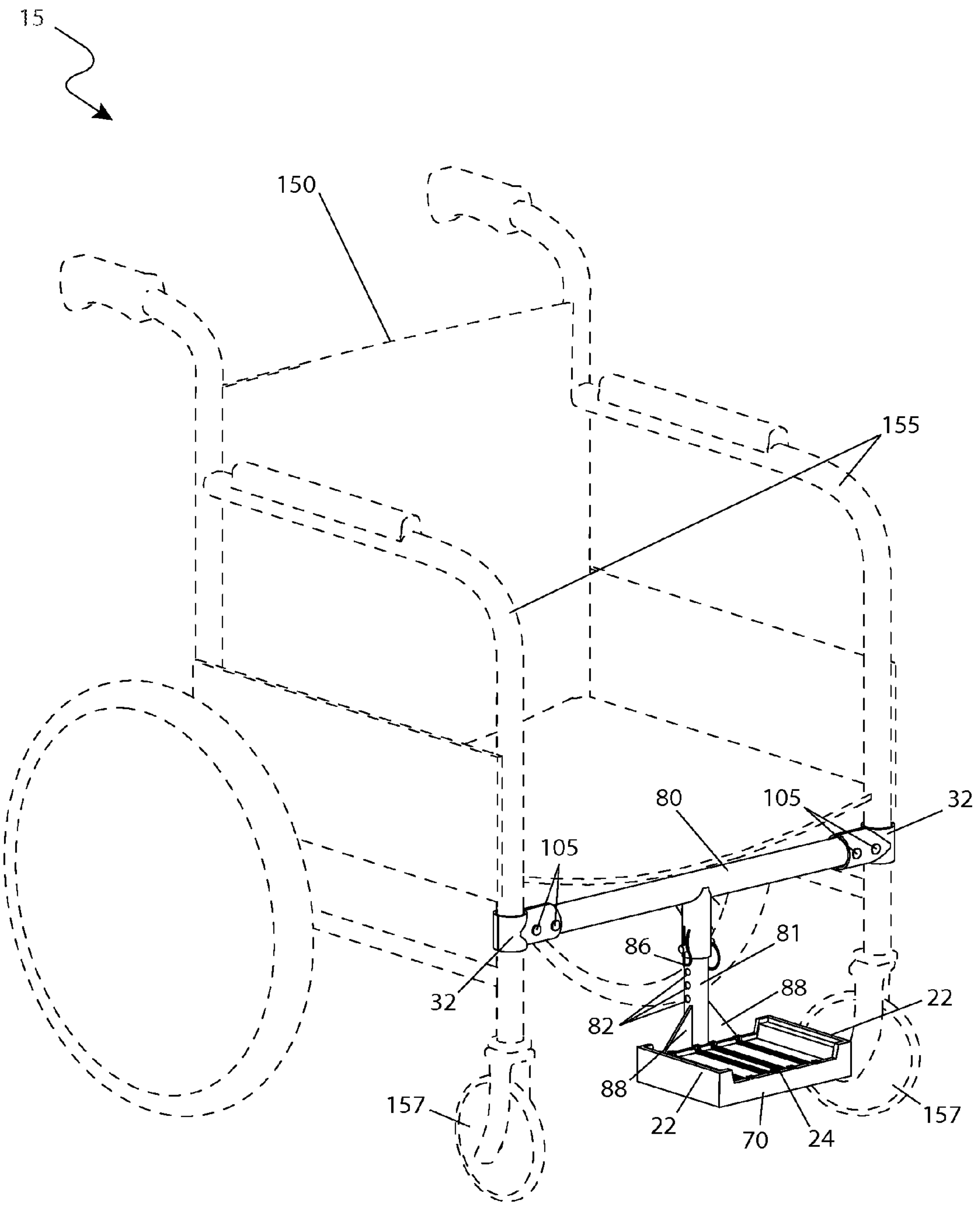
FIG. 4 is an environmental view of a rigid footrest embodiment 15, according to an alternate embodiment of the present invention; and, FIG. 5*a* is a front perspective view of the rigid footrest embodiment 15, according to an alternate embodiment of the present invention; and, FIG. 5*b* is a rear perspective view of the rigid footrest embodiment 15, according to an alternate embodiment of the present invention.
Figure 5A:
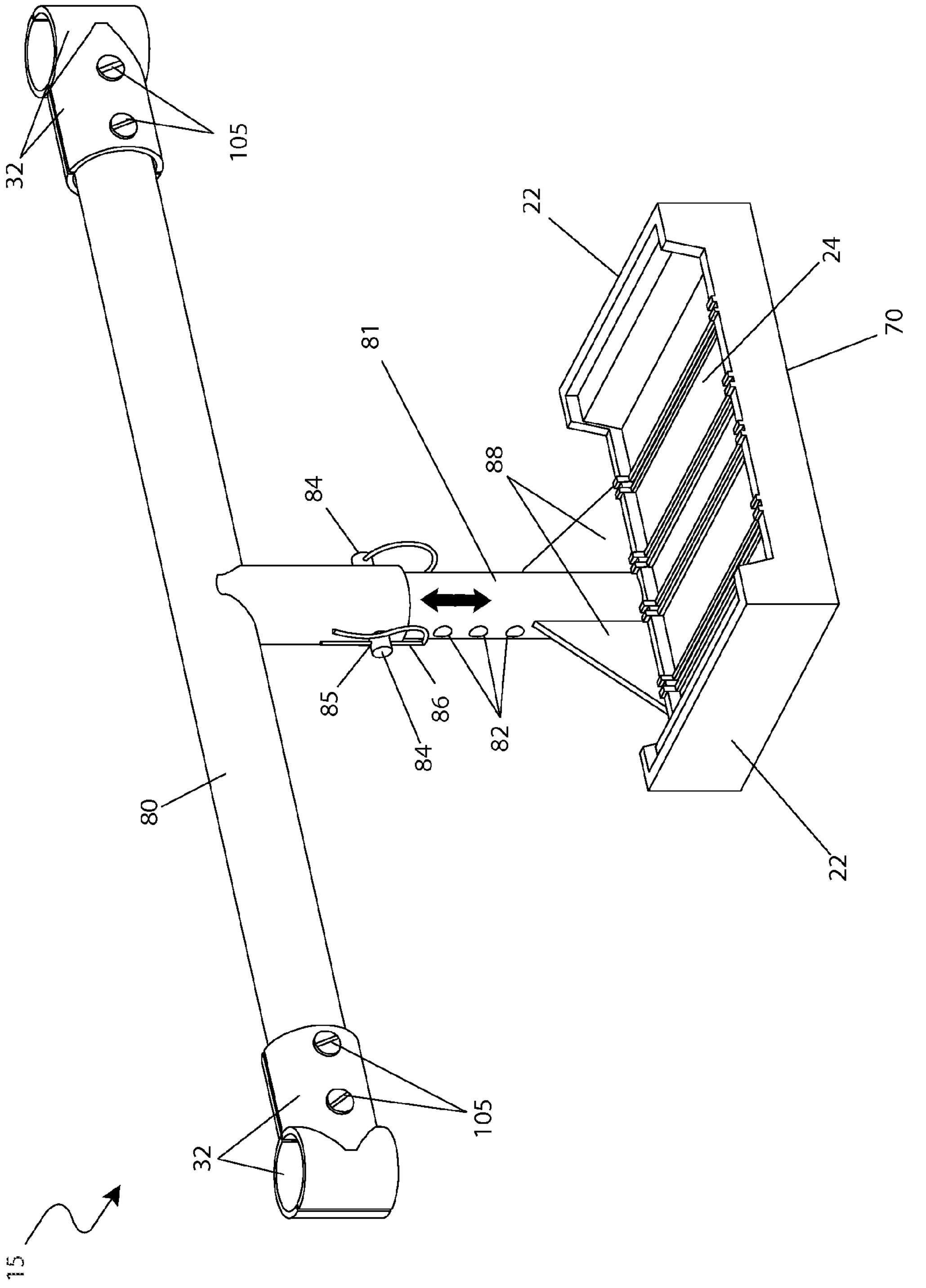
Figure 5B:
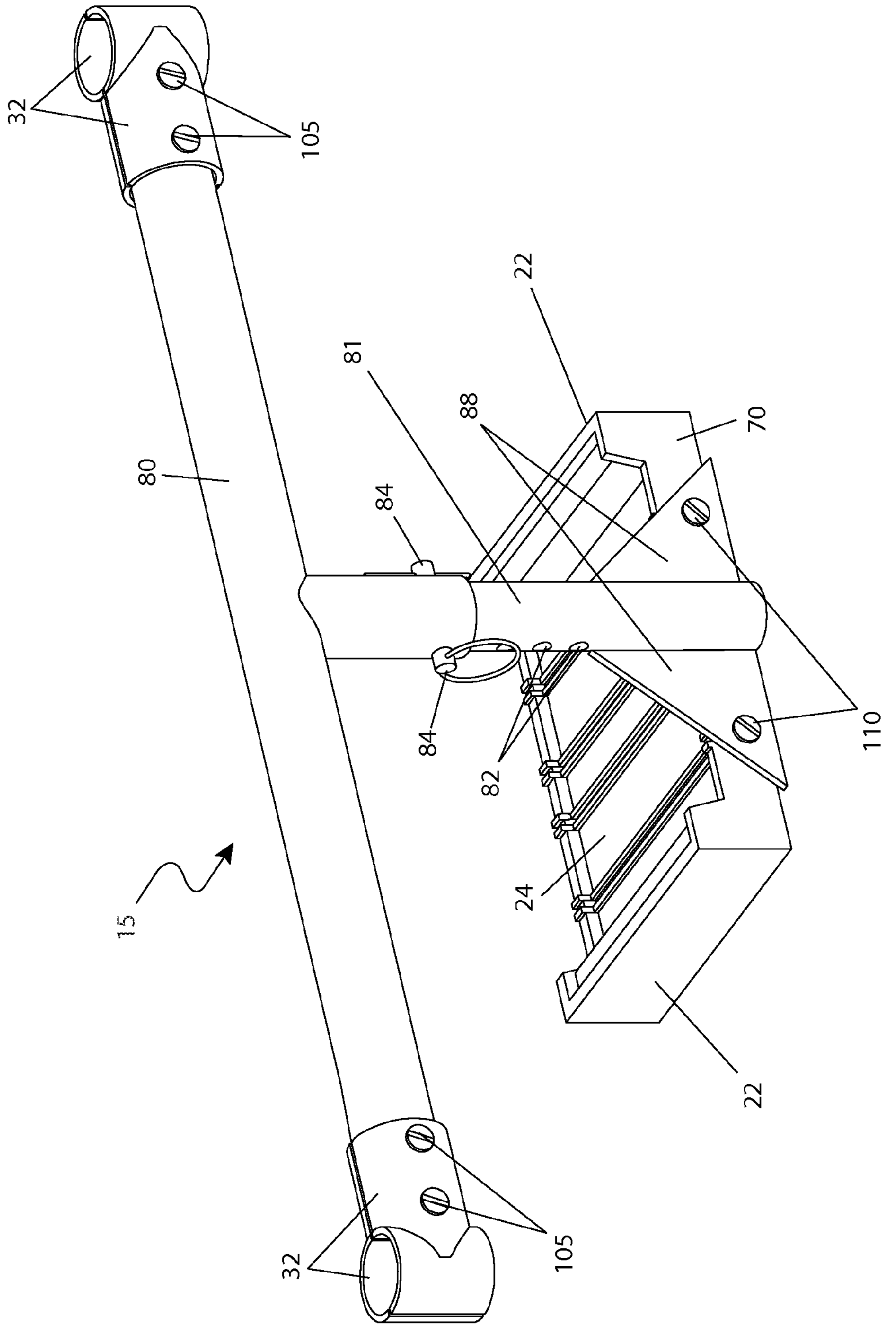

The best mode for carrying out the invention is presented in terms of its preferred embodiment, depicted within FIGS. 1 through 3 and in terms of an alternate rigid embodiment, depicted within FIGS. 4 through 5*b*. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a center footrest for a wheelchair (herein described as the "apparatus") 10, which provides temporary or permanent attachment of a centrally-located platform 20 to a common wheelchair 150. The apparatus 10 provides height adjustability of said platform 20 via a pair of length-adjustable straps 40. The apparatus 10 may be utilized in lieu of a pair of conventional fold-down footrests, thereby providing a narrowed wheelchair assembly 150 and allowing an occupant to move freely through tightly confined quarters with ease and increased independence. The apparatus 10 may be permanently or temporarily attached thereto an existing wheelchair 150 due to its simple design.

Referring now to FIGS. 1 and 2, environmental and perspective views of the apparatus 10, according to a preferred embodiment of the present invention, are disclosed. The apparatus 10 comprises a platform 20, a pair of offset posts 30, and a pair of supporting straps 40. The platform 20 provides a foot resting surface comprising a suspended rectangular support plate made of lightweight metal further comprising a machined or cast textured top surface 24 and vertically upturned curb features 22 along both side edges to help contain and/or center an occupants feet. The occupant may place their feet side-by-side or slightly on top of each other upon the platform 20. The platform 20 is therefore located between front vertical frame members 155 and front wheels 157 of said wheelchair 150 at a central and slightly forward location. It is envisioned that the platform 20 is to be fabricated using durable lightweight materials such as, but not limited to: aluminum, plastic, or the like. The platform 20 provides an attachment to the straps 40 along both side surfaces being affixed using a pair of first fasteners 100 at an intermediate location along each side vertical surface allowing the platform 20 to be tilted freely by the occupant using his/her feet to obtain a comfortable resting angle. Said first fasteners 100 are envisioned to comprise shoulder bolts or similar fastener types which would allow free rotation of the straps 40 thereupon, relative to the platform 20. The straps 40 are to extend upwardly at a diverging angle forming a looping connection to respective strap fastener portions 34 which are affixed to a distal bottom surface of respective offset posts 30 (see FIG. 3).

The offset posts 30 comprise horizontal round tubular members made using lightweight materials such as tempered aluminum or the like, being approximately four (4) inches long, thereby providing correct forward positioning of the platform 20. Each offset post 30 is attached to said vertical frame members 155 slightly below a seat portion of the wheelchair 150. Said offset posts 30 are connected to and extend forwardly from said vertical frame members 155 via commercially-available two-piece clamping "T"-fittings 32. Said "T"-fittings 32 provide a coincidental tightening around both the offset post 30 and the vertical frame member 155 by tightening integral second fasteners 105 such as through-bolts, screws, or the like. However, said "T"-fittings 32 may also be introduced having various similarly designed fittings while still providing equivalent clamping functionality and as such, should not be interpreted as a limiting factor of the apparatus 10. The offset posts 30 also comprise a plastic or rubber cap 36 being inserted into a forward distal end portion to safely cover any sharp edges (see FIG. 3).

Each strap 40 provides support to the downward force applied by leg portions of the occupant. Each strap 40 is envisioned being made using a strong solid or woven strapping material such as nylon, leather, or the like, and further comprises an adjusting strap fitting 42, thereby providing the occupant with a length adjusting means to position the platform 20 with regards to an occupant's particular leg length as well as allowing easy detachment of the straps 40 and platform 20 from the wheelchair 150 if desired. The adjusting strap fittings 42 preferably comprise tri-glide-type fittings; however, other length adjusting devices may also be incorporated with equal benefit.

Referring now to FIG. 3, a close-up view of the strap fastener portion 34 for the apparatus 10, according to the preferred embodiment of the present invention, is disclosed. The strap fasteners 34 are envisioned to be smooth "U"-shaped metal structures having round cross-sections, thereby providing an effective attachment means to each strap 40. Each strap fastener 34 is affixed to a respective offset post 30 preferably using welded joints 38 or an equivalent permanent connection method.

Referring now to FIG. 4, an environmental view of the rigid footrest embodiment 15, according to the alternate embodiment of the present invention, is disclosed. The rigid footrest embodiment 15 comprises a "T"-shaped upper support member 80, an adjustable support member 81, and an alternate platform 70. Said upper support member 80 comprises a "T"-shaped weldment being attached to the vertical frame members 155 of the wheelchair 150 slightly below a seat portion and spanning horizontally from one (1) vertical frame member 155 to the other. The upper support member 80 comprises a tubular construction having a horizontal member being attached at outer end portions to the vertical frame members 155 in a similar manner and location as the previously described offset posts 30 using "T"-fittings 32. The center vertical member of the upper support member 80 extends centrally downwardly to provide an inserting attachment of the adjustable support member 81 in a telescoping manner. Said adjustable support member 81 provides vertical adjustment of the attached alternate platform 70.

Referring now to FIGS. 5*a* and 5*b*, front and rear perspective views of the rigid footrest embodiment 15, according to the alternate embodiment of the present invention, are disclosed. The adjustable support member 81 and attached alternate platform 70 are secured at a desired elevation to the upper support member 80 via selective insertion of a locking pin 84 through a first adjusting aperture pair 82 and a second adjusting aperture pair 85. The first adjusting aperture pairs 82 comprise a plurality of vertically arranged and aligned holes through the adjustable support member 81. The second adjusting aperture pair 85 comprises a single pair of aligned holes through the upper support member 80. The locking pin 84 illustrated here comprises a common round-headed fastener being secured using a common cotter-type retaining pin fastener 86; however, other fastening means may also be used with equal benefit such as, but not limited to: nuts and bolts, ball-lock quick-release pins, button actuated pins, or the like.

The rigid footrest embodiment 15 provides a stationary attachment of the adjustable support member 81 to the rigid horizontal platform 70 via a pair of integral welded braces 88 at a bottom end portion which protrude outwardly along opposing side surfaces of said adjustable support member 81 being fastened to said rigid platform 70 using non-rotating third fasteners 110 such as screws, rivets, or the like. The rigid platform 70 provides similar functionality as the aforementioned platform portion 20 of the preferred embodiment 10 having curb features 22 and a textured top surface 24 in like manner.

It is envisioned that other styles and configurations of the present invention can be easily incorporated into the teachings of the present invention, and only one particular configuration shall be shown and described for purposes of clarity and disclosure and not by way of limitation of scope.

The preferred 10 and alternate 15 embodiments of the present invention can be utilized by the common user in a simple and effortless manner with little or no training.

After initial purchase or acquisition of the preferred apparatus 10, it would be installed as indicated in FIG. 1. The method of installing and utilizing the preferred embodiment of the apparatus 10 may be achieved by performing the following steps: procuring a model of the preferred embodiment of the apparatus 10 suitable for an existing wheelchair 150 model; removing previously installed fold-down footrest portions from the vertical frame members 155 of an existing wheelchair 150; installing the offset posts 30 onto said vertical frame members 155 by sliding the "T" fittings 32 around said vertical frame members 155 at a desired height; tightening said "T" fittings 32 to said vertical frame members 155 by tightening the integral second fasteners 105 until said "T" fittings 32 are secured to said vertical frame members 155; looping the straps 40 through respective strap fastener portions 34 of each offset post 30; joining and adjusting each strap 40 to a desired length and height using the strap fittings 42; placing an occupant's feet on the platform 20; and, utilizing the wheelchair 150 in a normal manner as well as allowing said occupant to pass through narrow halls as needed.

After initial purchase or acquisition of the alternate rigid embodiment 15, it would be installed as indicated in FIG. 4. The method of installing and utilizing the alternate rigid embodiment 15 may be achieved by performing the following steps: procuring a model of the alternate rigid footrest embodiment 15 suitable for an existing wheelchair 150 model; removing previously installed fold-down footrest portions from the vertical frame members 155; attaching the "T" fitting portions 32 of the upper support member 80 thereto the vertical frame members 155 by sliding the "T" fittings 32 around said vertical frame members 155 at a desired height; tightening said "T" fittings 32 to said vertical frame members 155 by tightening the integral second fasteners 105 until said "T" fittings 32 are secured to said vertical frame members 155; inserting the adjustable support member 81 into the vertical leg of said upper support member 80; adjusting a length of the adjustable support member 81 and attached rigid platform 70 by selecting aligned first 82 and second 85 adjusting aperture pairs which result in a desired height of the rigid platform 70; inserting the locking pin 84 through said aligned first 82 and second 85 adjusting aperture pairs; securing said locking pin 84 using the retaining pin fastener 86; placing the occupant's feet thereon the rigid platform 70; and, utilizing the wheelchair 150 to allow an occupant to move freely through tightly confined quarters with ease and increased independence.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A footrest attachable to a wheelchair comprises:
a platform, further comprising:
a resilient and lightweight generally rectangular support plate, comprising an upper surface, a lower surface, a pair of first side edges, and a pair of second side edges; and,
vertically upturned curb features along said pair of first side edges;
a mounting assembly removably attaching said platform to said wheelchair, further comprising:
a wheelchair mounting means, comprising a length adjustment means for positioning said platform relative to said wheelchair; and,
a platform mounting means;
wherein said platform is positioned at a center lateral midpoint between wheels of said wheelchair and disposed at a height above a ground surface at a distance in front of a chair of said wheelchair;
wherein said platform provides a resting place for at least one foot of an occupant of said wheelchair:
wherein said platform is rotatably mounted to said wheelchair mounting means;
wherein said curb features provide a means to retain and center said at least one foot of said occupant on said platform; and,
wherein said wheelchair mounting means further comprises:
a pair of lightweight offset posts;
a pair of strap fasteners each affixed to a bottom surface of one of said pair of offset posts;
a pair of straps each having a first end removably attached to one of said pair of strap fasteners and a second end removably attached to one of opposing sides of said platform with said platform mounting means; and,
said length adjustment means further comprises an adjustment fitting located on each of said pair of straps;
wherein each of said pair of offset posts comprises a first end removably attached to a vertical frame member subjacent to said chair of said wheelchair via a clamping means;
wherein a protective cap is removably placed on an exposed second end of each of said pair of offset posts;
wherein said pair of straps supports said platform when a downward force is applied thereto; and,
wherein said platform mounting means enables said platform to freely rotate with respect to said wheelchair mounting means.

2. The footrest of claim 1, wherein said platform is fixedly mounted to said wheelchair mounting means.

3. The footrest of claim 2, wherein:
said wheelchair mounting means further comprises a lightweight T-shaped upper support member, comprising an upper end and a lower end extending downwardly from said upper end;
said length adjustment means further comprises:
a lightweight adjustable support member telescopingly mating with said lower end of said upper support member; and,
a securing means for securing a desired length of said adjustable support member with respect to said upper support member; and,
a pair of braces each having a first edge affixed to opposing sides of a bottom portion of said adjustable support member and a second edge removably attached to an upper rear portion of said platform with said platform mounting means;
wherein said upper end of said upper support member comprises opposing rectilinear end portions each removably attached to a vertical frame member subjacent to said chair of said wheelchair via a clamping means and spanning a distance therebetween; and,
wherein said upper support member, said adjustable support member, and said pair of braces supports said platform when a downward force is applied thereto.

4. The footrest of claim 3, wherein said upper support member and said adjustable support member each further comprise a tubular aluminum member.

5. The footrest of claim 1, wherein said upper surface further comprises a machined or cast textured surface.

6. The footrest of claim 1, wherein each of said pair of offset posts further comprises a horizontal tubular aluminum member having a length of approximately four inches.

7. The footrest of claim 1, wherein said pair of strap fasteners each further comprises a "U"-shaped structure having a round cross-section, thereby providing an attachment means to each of said pair of straps.

8. The footrest of claim 1, wherein said platform mounting means each further comprises a shoulder bolt.

9. A footrest attachable to a wheelchair comprises:
a platform, further comprising:
a resilient and lightweight generally rectangular support plate, comprising an upper surface, a lower surface, a pair of first side edges, and a pair of second side edges;
vertically upturned curb features along said pair of first side edges;
a wheelchair mounting means; and,
a platform mounting means for rotatingly mounting said platform to said wheelchair mounting means, further comprising a shoulder bolt;
wherein said platform is positioned at a center lateral midpoint between wheels of said wheelchair and disposed at a height above a ground surface at a distance in front of a chair of said wheelchair;
wherein said platform provides a resting place for at least one foot of an occupant of said wheelchair;
wherein said curb features provide a means to retain and center said at least one foot of said occupant on said platform;
wherein said upper surface further comprises a machined or cast textured surface wherein said wheelchair mounting means further comprises:

a pair of lightweight offset posts;

a pair of strap fasteners each affixed to a bottom surface of one of said pair of offset posts, further comprising a “U”-shaped structure having a round cross-section;

a pair of straps each having a first end removably attached to one of said pair of strap fasteners and a second end removably attached to one of opposing sides of said platform with said platform mounting means;

a length adjustment means, further comprising an adjustment fitting located on each of said pair of straps; and, said platform mounting means;

wherein each of said pair of offset posts comprises a first end removably attached to a vertical frame member subjacent to said chair of said wheelchair via a clamping means;

wherein a protective cap is removably placed on an exposed second end on each of said pair of offset posts; and, wherein said pair of straps supports said platform when a downward force is applied thereto.

10. The footrest of claim 9, wherein each of said pair of offset posts further comprises a horizontal tubular aluminum member having a length of approximately four inches.

* * * * *